3,667,920
MIXING TRAYS

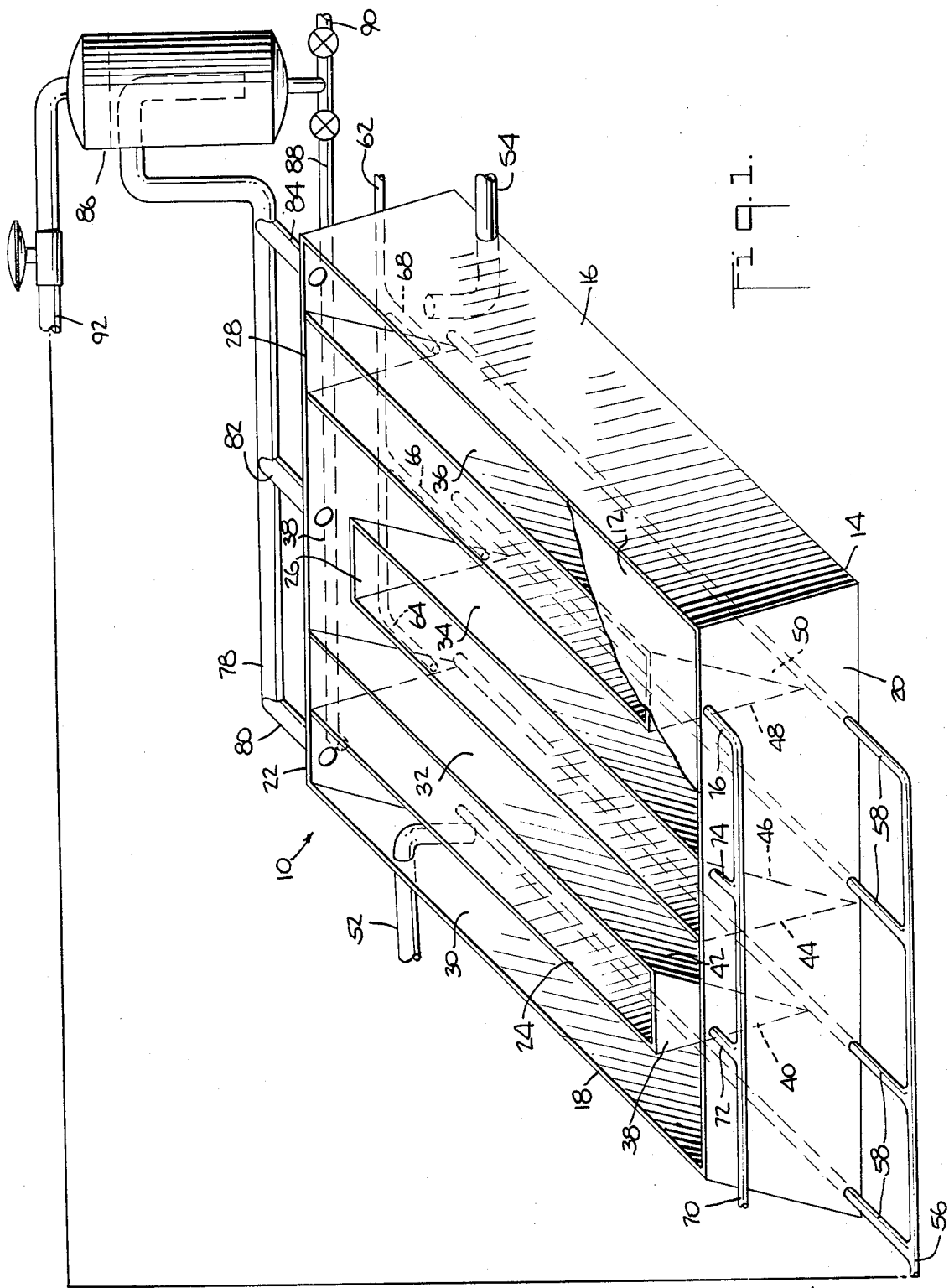

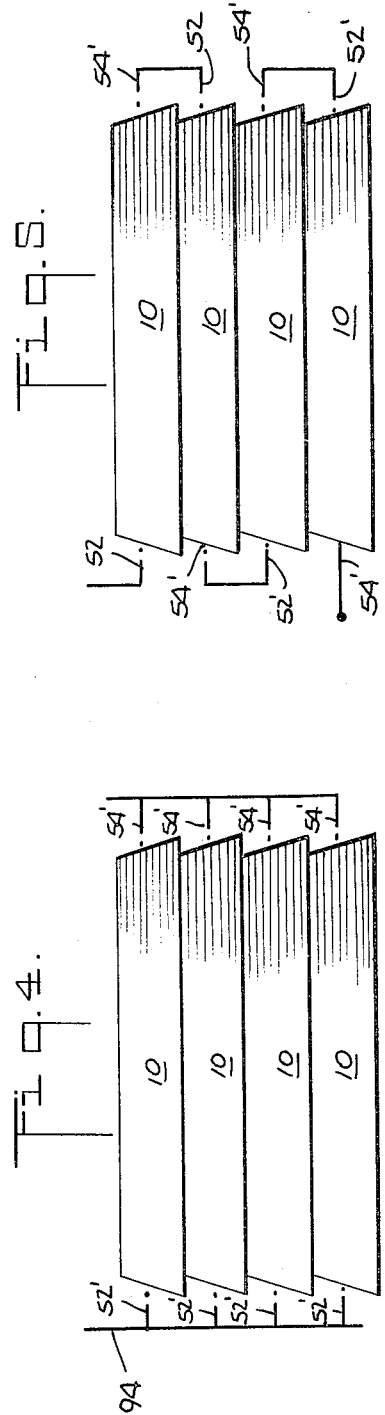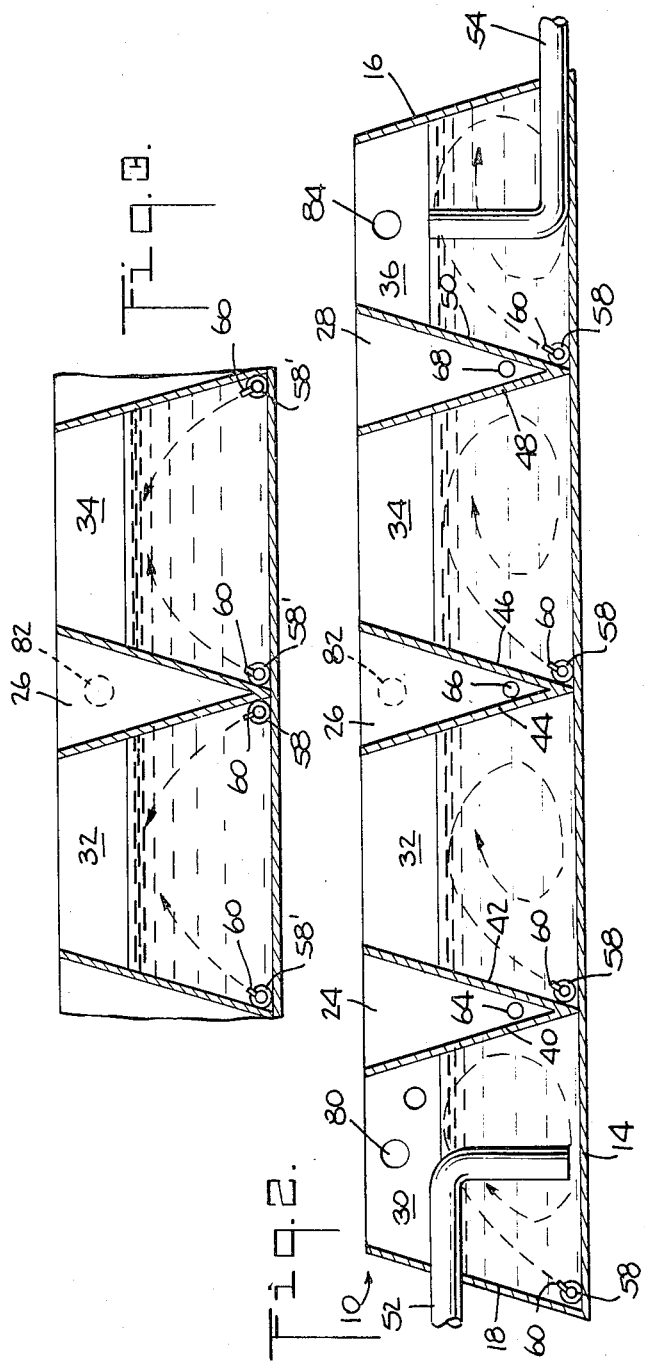

Ernest Koref, Panama City, Republic of Panama, and Elijah E. Petty, Mount Zion, Ill., assignors to M. Neumunz & Son, Inc., New York, N.Y.
Filed Nov. 13, 1969, Ser. No. 876,452
Int. Cl. B01j 9/16; C11c 3/12
U.S. Cl. 23—288 E
22 Claims

ABSTRACT OF THE DISCLOSURE

Method and apparatus for agitating a liquid, promoting a reaction between a liquid, a solid and/or a gas or maintaining or changing the temperature of a liquid. The liquid is passed along the length of an inclined side wall and the gas for agitation and/or mixing is passed upwardly along the inclined surface of the side wall to mix with the liquid.

---

This invention relates to the mixing of a liquid with a gas, and more particularly it pertains to methods and apparatus for mixing a liquid with a gas to either agitate a liquid, promote a reaction between a liquid, a solid and/or a gas, or maintain or change the temperature of a liquid. The term "liquid" is used herein to refer both to a liquid and a liquid-solid mixture.

Most presently known apparatus and methods for mixing a liquid with a gas utilize some sort of pneumatic and/or mechanical agitation. These known arrangements, while perhaps suitable for some specific applications, are subject to certain disadvantages. Specifically, many of such arrangements can only be used to carry out "batch" or intermittent mixing, and can not be used in continuous chemical processes. Also, many of these known mixing arrangements, even if adaptable for continuous chemical processes, do not effect efficient or the desired contact between a solid, a liquid, and/or gas to be mixed; while still other mixing arrangements are suitable only for one specific application, and are not versatile for use in a wide range of chemical processes requiring the mixing of a liquid with a gas.

The present invention contemplates a mixing arrangement and procedure for mixing a liquid which can be utilized in a wide range of chemical processes, including those processes carried out on a continuous basis, and which nevertheless provides the required contact between a liquid, a solid and/or a gas.

In accordance with the present invention, a liquid is mixed with a gas by passing the liquid along a flow path through a mixing zone defined, in part, by an inwardly inclined side wall extending parallel to the mixing path, and by admitting the gas to be mixed with the liquid along the bottom of this side wall so that the gas bubbles upward along the inclined surface of the side wall. Preferably, two side walls inclined inwardly to one another and extending parallel to the flow path are used and each inclines advantageously between 75 and 86 degrees with respect to the level of the liquid. The gas rising along this inclined surface will move the liquid upward and thus cause a circular motion of the liquid about the flow path. As the gas passes upward along the surface of the inclined wall, it makes intimate contact with the liquid passing lengthwise along the side wall and mixes with this liquid to a greater extent than if the gas is bubbled straight up through the liquid from the bottom.

The mixing action and the solid suspension capacity of this described mixing is determined, in the main, by the position, size and type of gas escape openings; and the desired rate of agitation as well as the desired amount of gas retention in the liquid are determined essentially by the rate of upward gas flow at the inclined side wall surfaces. Thus, it will be appreciated that by controlling both the gas flow rate and the liquid flow rate as well as any other parameters specific to the process of use, it is possible to use the present mixing arrangement to either agitate a liquid with a gas, promote a chemical reaction between materials in the mixing zone by causing intimate contact between the materials by the described gas mixing, or maintain or change the temperature of the material in the mixing zone by using the gas mixing to insure uniform contact with a heat exchanger.

In a preferred arrangement, the mixing apparatus of the present invention comprises a closed tray having two opposite side walls which incline inwardly to one another. This tray is partitioned by one or more spaced apart but parallel dividing walls which define a plurality of interconnected parallel mixing zones as above described. To this end, the dividing walls are preferably triangular in cross section and are arranged to meet with the bottom of the tray with the apex portion of their cross section contacting and integral with the bottom. In this way, the dividing walls are arranged to extend parallel to but spaced apart from the mentioned side walls of the tray which incline inwardly. Thus, the inwardly inclined side walls of the tray and the side of the dividing wall facing them also define mixing zones having two inclined side walls constructed in accordance with the present invention. Also, if two or more dividing walls are utilized, one or more like parallel mixing zones will be defined in between these dividing walls. The dividing walls are preferably shorter in length than the mentioned inclined side walls, and abut in alternate fashion the remaining two side walls of the closed tray to connect serially the mixing zones of the tray. In this way, an interconnected liquid flow path is established which extend alternately or back and forth, from one of these remaining side walls to the other. A liquid inlet is provided near one end of this interconnected flow path for connection to a source of liquid to be mixed in the mixing zones of the tray; and an outlet is provided near the other end of this path for removing the mixed liquid from the tray. The inlet and outlet are arranged to continuously pass liquid through the mixing zones of the tray while maintaining a predetermined amount of liquid in each mixing zone.

Gas release means, such as perforated tubing arranged for connection to a suitable source of gas, is provided alongside at least one inclined side wall of each mixing zone and is preferably positioned near the side wall's juncture to the bottom of the tray, so that the gas discharged at its gas escape openings must pass upward along the adjacent inclined wall. In this way, the gas rising along the inclined wall will cause the liquid passing through the mixing zone to also move in circular fashion about the normal path of liquid flow and thus provide intimate contact between the liquid and the gas. Also, the position, size and type of gas escape openings in the tubing determines the mixing action as well as the solid suspenion capacity of the mixing in the mixing zone.

Preferably the dividing walls are hollow and are arranged to circulate heat exchange medium therethrough to control the temperature of the materials in the mixing zones of the mixing tray. Also, a vapor outlet may be provided in the tray, preferably above the liquid in each mixing zone to remove, if desired, the vapors produced therein during the mixing procedures, and/or control the mixing zone pressure.

The described mixing tray may vary in size depending on use and the amount or type of mixing desired. Also such tray may be used as a single unit or in conjunction with a plurality of other similarly constructed trays mounted in a stacked array. In the latter arrangement, the liquid inlets and outlets of the stacked trays may be connected in series or in parallel fashion, depending on the particular mixing process to be carried out. Thus, for example, a plurality of mixing trays constructed in accordance with the present invention may be used in a step-wise or progressive stage mixing process, with each tray maintained under a separate set of liquid and gas flow conditions; or a plurality of these trays may be suspended in a common pressure vessel maintained at common pressure and interconnected in series fashion so that the liquid mixed in the higher trays flows through the interconnected lower trays under the influence of gravity.

It will be appreciated, from the above, that the mixing tray contemplated by the present invention, can be utilized in performing mixing steps in many different types of chemical processes. For example, oil, such as vegetable oil, may be hydrogenated by forcing hydrogen gas up an inclined side wall in the mixing zones, while passing the oil and a catalyst suspension through the mixing zone. Similarly, by using an inert gas for agitation, the mixing arrangement may be used to create the intimate contact necessary to promote a chemical reaction, such as a reaction between crude oil and reagents in the refining of vegetable or animal fats. Also, by using an inert gas for agitation of refined fats or oils mixed with a bleaching media, such as clay, carbon and silica, the mixing arrangement of the present invention may function as a continuous bleacher. Likewise, by proper circulation of a heat exchange media through the described dividing walls of the tray, the mixing arrangement may be used for chilling oil to form winterization crystals or for deodorizing an oil. Thus, if an inert gas is used to establish a gentle agitation, and a coolant is circulated through the dividing wall of the mixing zone, crystals for winterization may be formed from oil circulated through the tray; or if steam is used for agitation and a high temperature heating media is circulated through the dividing walls, the mixing arrangement of the present invention may be used for deodorization of oils and fats.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as the basis for the designing of other structures for carrying out the several purposes of the invention.

Thus, while the several aspects of the present invention may be utilized for carrying out a wide range of different mixing steps, they will be particularly described in connection with a specific embodiment of the invention which is useful for hydrogenating oil, such as a vegetable oil, and which is chosen for purpose of illustration and description, and is shown in the accompanying drawings, forming a part of the specification, wherein:

FIG. 1 is a perspective view of a mixing tray constructed in accordance with the present invention for hydrogenating oil, such as vegetable oil and having a portion of the top broken away for clarity;

FIG. 2 is a sectional side view of the mixing tray shown in FIG. 1;

FIG. 3 is a sectional side view similar to FIG. 2, but shows a modification of the mixing tray shown in FIG. 1, wherein mixing gas is admitted up two inclined side walls in each mixing zone;

FIG. 4 is an elevational view of a stacked array of mixing trays constructed in accordance with the present invention and interconnected in parallel arrangement; and FIG. 5 is an elevational view of a stacked array of mixing trays constructed in accordance with the present invention and interconnected in series arrangement for carrying out a step-wise mixing process.

Referring to the drawings in more detail, there is shown in FIGS. 1 and 2, a mixing tray 10 constructed and arranged to carry out continuous hydrogenation of oil, such as vegetable oil. The mixing tray 10 is prism shaped, and has a top wall 12, shown partially broken away in FIGS. 1 and 2 for illustrative purposes, and a bottom wall 14, both of which are rectangularly shaped and extend parallel to one another. In addition, the mixing tray 10 has two inwardly inclined side walls 16 and 18, which incline inwardly from the bottom wall 14 to the top wall 12; as well as including two trapezoidally shaped side walls 20 and 22, which form the remainder of the side wall construction of the mixing tray 10. In the preferred embodiment, the mixing tray 10 is constructed of sheet metal or the like, and its side walls and top and bottom walls are integrally connected so as to form a closed compartment for housing the oil to be hydrogenated and maintaining the necessary hydrogenation pressures, as required.

As best shown in FIG. 1, the closed compartment of the mixing tray 10 is partitioned by three dividing walls 24, 26 and 28 which define four interconnected but parallel extending mixing zones 30, 32, 34 and 36. Each of the dividing walls 24, 26 and 28 is triangular in cross section and is arranged parallel to the inclined side walls 18 and 16 of the tray 10 with its apex portion of the cross section meeting the bottom wall 14. In addition, each of the dividing walls 24, 26 and 28 has a shorter longitudinal length than the internal longitudinal length of the parallel side walls 18 and 16, and is positioned to abut alternate ones of the other side walls 20 and 22 to define an opening 38 between adjacent mixing zones and define a liquid flow path which extends serially through the mixing zones 30, 32, 34 and 36. Specifically, as shown in FIG. 1, the dividing wall 24 is arranged to extend parallel to but spaced apart from the longitudinal length of the side wall 18 and abut the other side wall 22. Thus, in this arrangement, the inclined side wall 18 and a facing inclined surface 40 of the dividing wall 24 incline towards each other and define the mixing zone 30. Similarly, the dividing wall 26 is arranged to extend parallel, but spaced apart from the dividing wall 24, and abut the other side wall 20. Thus, mutually facing inclined surfaces 42 and 44 of the dividing walls 24 and 26, incline towards each other and define the mixing zone 32. Likewise, the dividing wall 28 is located to extend parallel to, but spaced apart from both the dividing wall 26 and the inclined side wall 16 of the tray 10. In addition, the dividing wall is arranged to abut against the other side wall 22 so that inclined mutual facing surfaces 46 and 48 of the dividing wall 26 and 28, respectively, incline inwardly towards each other, and define the mixing zone 34; and a mutual facing surface 50 of the dividing wall 28 and the inclined wall 16 of the mixing tray 10 incline inwardly to each other, and define the mixing zone 36. Advantageously, each of the mentioned opposite facing surfaces defining the mixing zones in the tray 10 incline between 75 and 86 degrees with respect to the bottom 14.

As best shown in FIG. 2, an inlet nozzle 52 is provided to extend into the mixing area 30 near its dead end side adjacent the side wall 22. The inlet nozzle 52 is arranged to feed a liquid comprising an oil to be hydrogenated and a catalyst, into the mixing tray 10 near the bottom 14 thereof, so that during normal continuous operation, little or no disturbance is made near the top level of the oil in the mixing area 30. Similarly, an outlet drain 54 is provided at the other end of the interconnected flow path in the mixing tray 10, and specifically near the dead end side of the mixing zone 36. The outlet drain 54 is arranged to remove the liquid from the mixing tray 10 from near its top. The inlet nozzle 52 and the outlet drain are relatively arranged to maintain the liquid passing through the tray at substantially a constant level during the hydrogenation process. Thus, it will be appreciated that by the provision of the inlet nozzle 52 and the outlet drain 54, oil is continuously circulated through the interconnected mixing zones 30, 32, 34 and 36 of the mixing tray 10.

Hydrogen gas is transported to the mixing zones 30, 32, 34 and 36 by a common conduit 56 which is connected to a source of hydrogen supply (not shown) and to a hydrogen recirculation system of the mixing tray 10. The hydrogen gas is fed to each of the mixing zones 30, 32, 34 and 36 by a gas conduit 58 which is coupled to the common conduit 56 and which extends through the side wall 20 of the tray 10 and along one inclined surface of each of the mixing zones 30, 32, 34 and 36 near the point where this surface merges with the bottom wall 14. In this way, gas discharged from the conduits 58 must pass upward along its associated inclined wall. Thus, as best shown in FIG. 2, a gas conduit 58 is located at the angled juncture between the side wall 18 of the tray and the bottom wall 14; a gas conduit 58 is provided near the bottom of the inclined surface 42 of the dividing wall 24; a gas conduit 58 is provided near the bottom of the inclined surface 46 of the dividing wall 26; and a gas conduit 58 is provided near the bottom of the inclined surface 50 of the dividing wall 28. In this way, the gas rising along each of these described inclined surfaces will cause the liquid passing through its associated mixing zone to also move in circular fashion about its normal flow path and thus make intimate contact between the liquid and the hydrogen gas. To this end, each conduit 58 has a plurality of gas escape openings 60 (FIG. 2) along its length which, depending on position, size and type, determine the mixing agitation and solid suspension capacity of the mixing arrangement.

As shown in FIGS. 1 and 2, the dividing walls 24, 26 and 28 are of a hollow construction, and are arranged to circulate heat exchange medium therethrough. To this end, each of the hollow dividing walls 24, 26 and 28 is connected to a common liquid inlet or condensate outlet conduit 62 through individual conduits 64, 66 and 68, respectively; and are also connected to a common liquid outlet or vapor inlet conduit 70 by individual conduits 72, 74 and 76, respectively.

In order to remove any vapor or to establish any necessary back pressure, each of the mixing areas 30, 32, 34 and 36 is connected to a common pressure or vapor conduit 78 by individual conduit connections 80, 82 and 84 (connection 82 is common to both the mixing zones 32 and 34). The common vapor conduit 78 is, in turn, connected to a gas-liquid separator 86 which breaks the vapor down into its gas and liquid components. The separated liquid which is the oil to be hydrogenated, may be returned back via a conduit 88 to the input of the mixing tray 10 or discarded through a discharge conduit 90. Similarly, the separated gas, which is, of course hydrogen, may be recirculated back through a recirculation conduit 92 connected to the hydrogen common conduit 56.

In order to continuously hydrogenate oils, such as a vegetable oil, the required oil-catalyst mixture is fed at the required hydrogenation temperature, advantageously between 320° F. and 425° F., and at a predetermined flow rate, advantageously between 20–500 lbs. per hour to the mixing tray 10 through the inlet nozzle 52. As discussed above, the rate in which this oil passes through the tray 10 determines, in part, the degree of hydrogenation the oil undergoes in the tray 10. Under normal operation, the oil-catalyst mixture fills the mixing tray 10 to a level substantially corresponding to the level at which the output drain 54 extends up in the tray 10 and the oil-catalyst liquid is continuously fed from the inlet nozzle 52 through the interconnected mixing zone 30, 32, 34 and 36 of the mixing tray 10, and out the outlet drain 54.

Simultaneously with the above, hydrogen gas is fed through the common gas conduit 56 to the individual gas conduits 58 in each of the mixing zones 30, 32, 34 and 36 so that gas is forced upward along the inward sloping surfaces of their associated inclined walls. In this way, the hydrogen gas is intimately mixed with and agitates the oil and solid catalyst mixture, and maintains a uniform suspension of the catalyst in the oil. As shown in FIG. 2, the upward movement of the hydrogen gas causes the liquid in the mixing zones to rotate about its normal flow path. The desired amount of intimate mixing and agitation is established by adjusting the rate of hydrogen gas flow into the mixing zones 30, 32, 34 and 36. Advantageously, the hydrogen gas flow rate may be between .025 and 5 cubic feet per minute. Because the agitation action between the hydrogen gas admitted from the gas conduits 58 and the liquid mixture in each of the mixing areas gives excellent intimate contact between the oil, catalyst and hydrogen, the hydrogen enters into reaction with the oil in the presence of the catalyst thereby at least partially hydrogenating the oil.

Since hydrogenation is an exothermic reaction, coolant is circulated between the common input conduit 62 and the common output conduit 70 through the hollow dividing walls 24, 26 and 28 to maintain the oil and catalyst passing through the mixing tray 10 at the desired hydrogenation temperature. As the interior pressure of the tray 10 will also affect the extent of hydrogenation, the pressure within each of the mixing zones 30, 32, 34 and 36 may be controlled by regulating the amount of hydrogen flow into the mixing area 10 and by regulating the back pressure control at the common vapor conduit 78. Such pressures may advantageously range between 3 and 300 p.s.i.g.

As the oil-catalyst mixture moves along the flow path established by the serially interconnected mixing zones 30, 32, 34 and 36, the hydrogenation reaction proceeds in a step-wise manner. Thus, by adjusting the hydrogen gas flow rate, the oil-catalyst flow rate, the level of oil in the tray 10, the pressure and the temperature, the desired degree, selectivity and speed of hydrogenation can be realized in a very simple manner.

Any unreacted hydrogen gas in the mixing zones 30, 32, 34 and 36 accumulates above the liquid level in the mixing tray 10, and is collected as vapor through the individual conduits 80, 82 and 84 and passed through the gas-liquid separator 86. The separator 86 removes the oil content from this vapor and reverts it back through the conduits 88 to the mixing tray 10. In addition, the separator 86 removes the hydrogen gas content from this vapor and recirculates it back through the conduit 92 to the mixing tray 10.

As illustrated in FIG. 3, in accordance with another arrangement of the present invention, it is possible to provide gas admitting conduits 58' along both of the inclined surfaces which define the mixing zones of the mixing tray 10. With this arrangement, the liquid circulated through the mixing zone will be rotated in opposite directions about its flow path and forced downwardly as diagrammatically shown in FIG. 3.

Also, as shown in FIGS. 4 and 5, a plurality of mixing trays 10 constructed in accordance with the present invention, may be arranged in stacked array and connected in parallel (FIG. 4) or in series (FIG. 5), depending on the particular degree of hydrogenation desired. Thus as shown in FIG. 4, the mixing trays 10 may be arranged in stacked array, and their inlets 52' connected to a common oil-catalyst conduit 94 and their outlet 54' connected to a common hydrogenated oil outlet 96 so that the oil-catalyst mixture which enters each of the stacked mixing trays 10 will undergo essentially the same mixing and hydrogenation, and will present essentially the same state of hydrogenation at their output. Alternatively, the outlet 54' of each of the stacked array of mixing trays 10 is connected to the input 52' of the mixing tray 10 directly below it. In this way, the stacked array of mixing trays 10 may be used to carry out a "step-wise" or progressive mixing to hydrogenate oil in progressive stages.

While the preferred embodiment has been described in connection with the hydrogenation of an oil, such as vegetable oil, it will be appreciated that the mixing tray 10 may be utilized for carrying out the other chemical mixing processes. Thus, if an inert gas if forced through the gas conduits 58 and vegetable or animal fat liquids are circulated through the tray 10, the mixing arrangement can be used to create the intimate contact necessary to promote a reaction between the oil and associated reagents in refining of the vegetable or animal fats and oils. In this case, a heating medium (steam) would be circulated through the walls 24, 26 and 28 for elevating the temperature of the liquid in the mixing areas to the desired process temperature. Also, if an inert gas, such as nitrogen or carbon dioxide, is forced through the gas conduits 58 and a mixture of refined fats and oils and bleaching media, such as clay, carbon or silica is fed through the mixing tray 10, the fats and oils may be subjected to continuous bleaching. In this arrangement, because high temperatures are usually needed in bleaching processing, the dividing walls 24, 26 and 28 would be utilized to circulate heat exchange media. Likewise, the mixing tray 10 could be utilized for producing crystals for winterization by utilizing an inert gas, and a coolant in the dividing walls 24, 26 and 28. In this case, the liquid and the gas feed rates should be low so as to produce the required general agitation and efficient heat exchange to produce the crystals. Also, if steam and high temperature heating media are circulated through the dividing walls 24, 26 and 28, and steam is also utilized for gas agitation, the mixing tray 10 could be utilized for deodorization of oils and fats. Finally, the mixing tray 10 could be utilized for fermentations of all kinds and/or for the growth of cultures which can be accelerated by a gas, such as air or oxygen and also by agitation. For example, the mixing tray 10 may be utilized for the synthesis of proteins from hydrocarbon.

EXAMPLE

As an illustration of the advantages of this invention, a pilot soy bean oil hydrogenation reactor was constructed to define a mixing zone 24 inches long, 9 inches wide and 18 inches high. The two side walls forming the length of the mixing zone were established to incline inwardly into the mixing zone at an angle of 82.5° with respect to the bottom. As arranged, the mixing zone has a capacity of 20 pounds of soy bean oil mixture.

The pressure within the zone was established at 8 p.s.i.g. and the hydrogenation reaction temperature was set at 320° F. Refined and bleached soy bean oil having an iodine value of 129 and admixed with .01% nickel catalyst was passed through the mixing zone at a rate of 120 pounds per hour while the level of the oil mixture in the mixing zone was maintained at about 9 inches high. In this way, the reaction time of the oil in the mixing zone was approximately 10 minutes. Simultaneously, hydrogen gas was passed at a rate of .85 cubic feet per minute upwardly along one inclined longitudinal side wall defining the mixing zone. The oil after passing through the described mixing zone was then tested and found to have a final iodine value of 122.

Thus it will be appreciated from above, that the mixing arrangement and procedure of the present invention can be utilized in a wide range of chemical processes including those processes carried out on a continuous basis, and which nevertheless provides required contact of the liquid, solid and/or gas utilized.

What is claimed is:

1. A continuous mixing apparatus for mixing a liquid with a gas comprising: compartment means for containing said liquid and defining a mixing zone, said compartment means being defined on at least one side by an inclined side wall extending inwardly and upwardly from the bottom of said compartment means, inlet and outlet means for continuously passing said liquid through said mixing zone and along a flow path parallel to the length of said side wall, and gas release means along said inclined side wall for passing said gas upwardly along the inclined surface of said side wall and causing said liquid also to move upwardly along said side wall whereby said gas mixes with said liquid at said inclined side wall and causes the liquid to rotate about said flow path while it also passes parallel to the length of said side wall.

2. An apparatus for mixing a liquid with a gas as in claim 1 wherein said side wall inclines advantageously between 75 and 86 degrees relative to the bottom of said compartment.

3. An apparatus for mixing a liquid with a gas as in claim 1 wherein said gas release means includes conduit means which extends essentially parallel to the length of said side wall and is located near said bottom and which is arranged to admit said gas for passage up said inclined wall.

4. An apparatus for mixing a liquid with a gas as in claim 1 wherein said side wall is thermally coupled to a heat exchange medium, whereby said gas agitates said liquid to maintain said liquid in contact with said side wall to promote heat exchange.

5. An apparatus for mixing a liquid with a gas as in claim 1 wherein said inlet and outlet means includes an inlet for admitting said liquid essentially near one end of the length of said side wall and an outlet for removing said liquid near the other end of the length of said side wall.

6. An apparatus as in claim 5 wherein said liquid comprises an oil to be hydrogenated and a catalyst, and further comprising means connecting said gas release means to a source of hydrogen gas whereby said oil is at least partially hydrogenated as it passes through said mixing zone.

7. An apparatus for mixing a liquid with a gas as in claim 1 and wherein said mixing zone is defined on two opposite sides by inclined side walls extending inwardly and upwardly from the bottom of said compartment means, and wherein said gas release means extends along at least one of said side walls.

8. An apparatus for mixing a liquid with a gas as in claim 7 wherein said gas release means includes conduit means.

9. An apparatus as in claim 8 wherein said liquid comprises an oil to be hydrogenated and a catalyst, and further comprising means connecting said gas release means to a source of hydrogen gas whereby said oil is at least partially hydrogenated as it passes through said mixing zone.

10. A continuous mixing apparatus for mixing a liquid with a gas comprising: a tray for containing said liquid, partition means in said tray and defining said at least two interconnecting mixing zones, each of said mixing zones being defined on at least one side by an inclined side wall extending inwardly and upwardly from the bottom of said tray, inlet and outlet means for continuously passing said liquid through said interconnected mixing zones and along a flow path parallel to the length of said inclined side wall in each mixing zone, and gas release means in each of said mixing zones and adjacent said inclined side wall thereof for passing said gas upwardly along the inclined surface of said side wall and causing said liquid to move upwardly along said side wall whereby said gas mixes with said liquid at said inclined side wall and causes the liquid to rotate about said flow path while it also passes parallel to the length of said side wall.

11. An apparatus for mixing a liquid with a gas as in claim 10 wherein each of said mixing zones is defined on two opposite sides by side walls which incline inwardly to the mixing zone.

12. An apparatus for mixing a liquid with a gas as in claim 11 wherein two opposite sides of said tray are inclined inwardly to each other, and wherein said partition means includes at least one prism partition of triangular cross section extending parallel to said two opposite sides of said tray the apex of said prism partition abutting the bottom of said tray, to form at least two mixing zones, each mixing zone having two opposite side walls inclined to one another, and the mixing zones immediately adjacent said inclined side walls of said tray being formed in part by said adjacent side walls of said tray.

13. An apparatus for mixing a liquid with a gas as in claim 12 wherein each of said partition means is constructed to circulate heat exchange medium therethrough to control the temperature of the adjacent inclined surfaces at the mixing zones.

14. An apparatus for mixing a liquid with a gas as in claim 12 wherein vapor exhaust means is provided in said tray and above the liquid therein for removing vapor.

15. An apparatus for mixing a liquid with a gas as in claim 12 wherein the two side walls defining said mixing zone incline advantageously between 75 and 86 degress relative to the bottom of said tray.

16. An apparatus for mixing a liquid with a gas as in claim 12 wherein said gas release means includes a conduit extending in each of said mixing zones and parallel to at least one of said inclined walls thereof to admit said gas for passage up said inclined wall from near the bottom of said tray.

17. An apparatus for mixing a liquid with a gas as in claim 16 wherein each of said partition means is arranged to serially interconnect each of said mixing zones to form an essentially continuous liquid flow path and wherein inlet means are provided near one end of said flow path and outlet means are provided near the other end of said flow path, whereby said liquid passes through said tray in said flow path and along the length of said side walls therein to be agitated by said gas.

18. An apparatus for mixing a liquid with a gas as in claim 16 wherein said tray includes means adaptable to contain oil to be hydrogenated and a catalyst, and further comprising means connecting said gas release means to a source of hydrogen gas whereby said oil is at least partially hydrogenated as it passes through said tray.

19. An apparatus for mixing a liquid with a gas as in claim 18 wherein said partition means include means for communicating with coolant whereby said inclined side walls of said partition means are cooled and said oil and catalyst are maintained at hydrogenation temperature.

20. A method for continuously mixing a liquid with a gas in a compartment means comprising continuously passing said liquid along a flow path parallel to the length of an inclined side wall extending inwardly and upwardly from the bottom of said compartment means, admitting said gas upwardly along the inclined surface of said side wall and causing said liquid to also move upwardly along said side wall whereby said gas mixes with said liquid at said inclined side wall and causes the liquid to rotate about said flow path while it also continuously passes parallel to the length of said side wall.

21. A method of mixing a liquid with a gas as in claim 20 and further comprising the step of thermally coupling inclined side walls to a heat exchange medium.

22. A method of mixing a liquid with a gas as in claim 20 and further comprising the step of withdrawing vapor above said mixing zone.

References Cited

UNITED STATES PATENTS

| | | | |
|---|---|---|---|
| 466,310 | 12/1891 | Ritter | 261—77 X |
| 622,581 | 4/1899 | Workman | 261—124 UX |
| 1,367,394 | 2/1921 | Instone | 261—121 |
| 1,899,005 | 2/1933 | Barker | 68—183 |
| 2,460,083 | 1/1949 | Harbaugh | 23—285 |
| 2,521,334 | 9/1950 | Boerstra | 261—124 |
| 2,644,009 | 6/1953 | Cash et al. | 23—285 X |
| 3,236,767 | 2/1966 | Ross et al. | 261—123 X |
| 3,271,304 | 9/1966 | Valdespino et al. | 261—121 X |
| 3,276,994 | 10/1966 | Andrews | 261—124 X |
| 3,339,741 | 9/1967 | Bernard et al. | 210—220 X |

MORRIS O. WOLK, Primary Examiner

B. S. RICHMAN, Assistant Examiner

U.S. Cl. X.R.

23—285; 68—183; 165—108; 260—409; 261—77, 121 R, 123, 124, 125, 126